United States Patent Office 3,513,660
Patented May 26, 1970

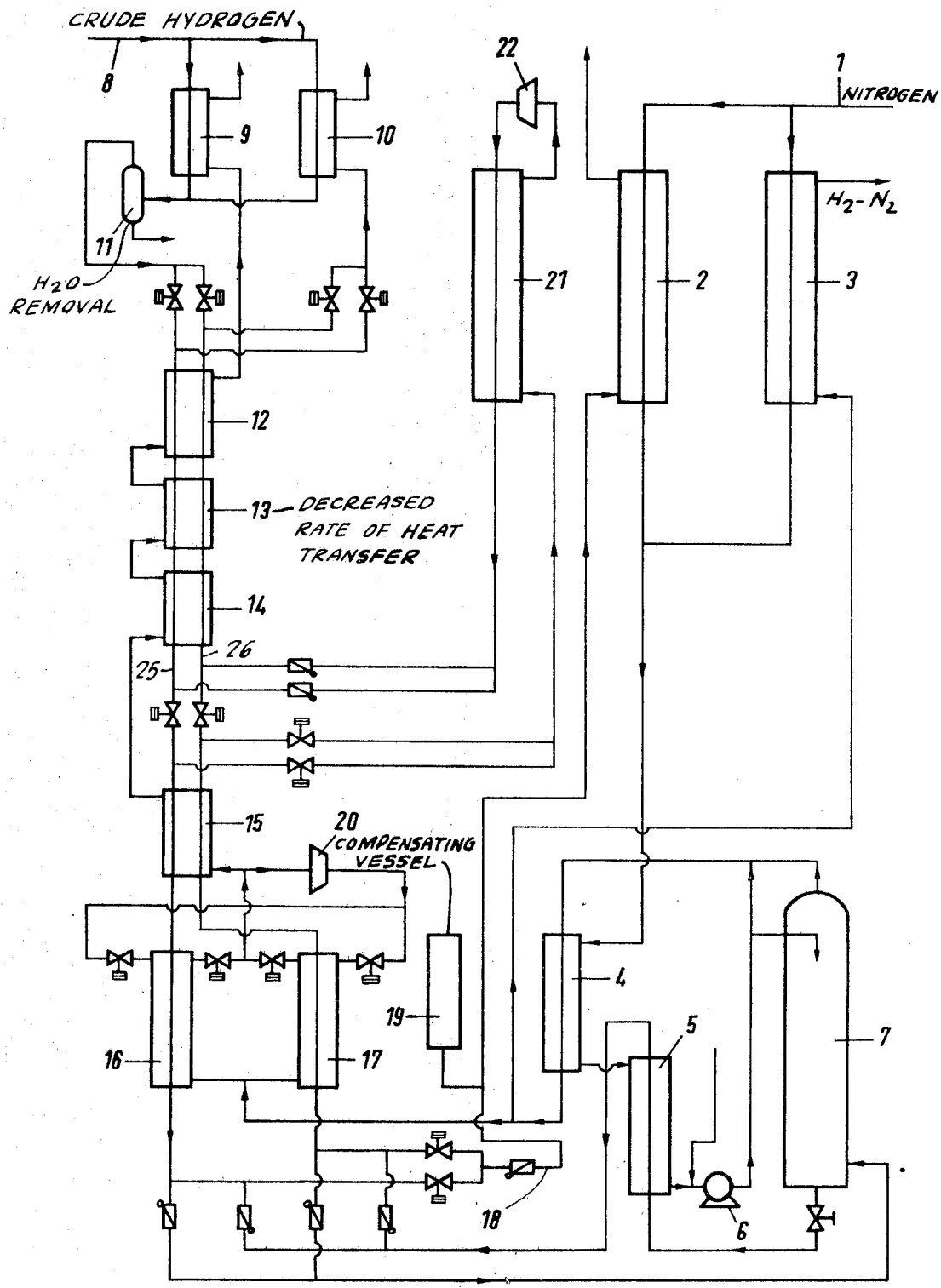

---

3,513,660
REMOVAL OF CONGEALABLE IMPURITIES FROM GASES
Rudolf Becker, Munich-Solln, Germany, assignor to Linde Aktiengesellschaft, Wiesbaden, Germany
Filed May 10, 1966, Ser. No. 548,899
Claims priority, application Germany, May 10, 1965, G 43,555
Int. Cl. F25j *3/08*
U.S. Cl. 62—12                                15 Claims

ABSTRACT OF THE DISCLOSURE

In a low temperature system for the removal of impurities such as $CO_2$ wherein the $CO_2$ is congealed on alternating heat exchange surfaces, and wherein the $CO_2$ usually is deposited on a relatively small area of heat exchange surface, thereby causing rapid build-up and clogging of conduits, the improvement comprising reducing the rate of heat transfer so that the $CO_2$ is deposited over a much larger heat exchange surface, a particular method being to compress scavenging gas to such a pressure that the congealed $CO_2$ sublimes at a temperature of only about 5–10° C. below the temperature at which the $CO_2$ is congealed in the crude gas, both of said gases being in indirect heat exchange therewith.

---

This invention relates to a process and apparatus for the drying and/or purification of gases having a high content of impurities, and particularly for the purification of gases having a high content of carbon dioxide.

For the removal of $CO_2$ from a gaseous stream, there are several known types of processes. For example, there are processes wherein the $CO_2$ is scrubbed out by absorption agents which either dissolve or chemically combine with $CO_2$. In such absorption processes, there are two essential operating steps, i.e., the absorption of the impurities and the regeneration of the absorption agent. These steps, on the one hand, require a considerable investment in apparatus and, on the other hand, involve substantial direct operating costs, principally in the form of make-up absorption agent and energy required for absorption and regeneration.

Thus, for example, in the known "Rektisol" process, gases to be purified, such as gases for the Fischer-Tropsch synthesis, are scrubbed with liquid methanol at a pressure of, e.g., 20 to 25 atmospheres, this being done in several stages, with separate methanol cycles. For regenerating purposes, the methanol is distilled, subjected to a stepwise expansion, and rectified. It is, therefore, readily apparent that the equipment and operating costs for such a plant are substantial.

Another known physical scrubbing process, using compressed water, can be conducted in an economically feasible manner only when very favorable water conditions are present.

In the known chemical absorption processes wherein the impurities are chemically bound to the absorption agent, for example, alkanol amines, there are again high energy costs for regeneration.

Another known method to remove impurities from gases is by congealing the impurities in reversible heat exchangers. These processes, however, can be employed for $CO_2$ removal only when the $CO_2$ is present in the raw gas to only a very minor extent (for example $CO_2$ in air). If such processes were to be used for the purification of gases having a high percentage of $CO_2$, the heat exchangers would be clogged with congealed $CO_2$. This is the case because solid $CO_2$ has a very steep vapor pressure curve. Thus, a small decrease in the temperature of the raw gas effects a large change in the partial pressure which, if near the freezing point, results in large amounts of $CO_2$ being frozen out in a short section of the heat exchanger.

A principal object of this invention, therefore, is to provide an improved process for the removal of $CO_2$ from gases, said process being particularly useful for the removal of $CO_2$ when it is present in relatively high concentrations in gases.

Another object is to provide apparatus for conducting the novel process of this invention.

Upon further study of the specification and claims, other objects and advantages of the present invention will become apparent.

To attain the objectives of this invention, there is provided a low temperature process wherein the $CO_2$ is congealed on alternating heat exchange surfaces, and in particular wherein the rate of heat transfer between the coolant and the $CO_2$-containing raw gas is decreased, especially in the section of the heat exchanger wherein a relatively large concentration of $CO_2$ is present in the gas.

The process of this invention has substantial advantages as compared to known processes. For example, the investment cost for apparatus is considerably less than that of the known $CO_2$ washing processes. Aside from the lowering of indirect operating costs (depreciation), the direct operating costs are also lower, inasmuch as the energy requirements for the present process are less. Consequently, there are considerable over-all savings for $CO_2$ removal, particularly in connection with low temperature plants for ammonia-synthesis gas or hydrogen liquefaction, for example.

The fact that the rate of heat transfer is decreased in the zone where gas contains a relatively large concentration by volume of $CO_2$, e.g. at least 5%, preferably at least 10%, has the advantage that the gas cools off less rapidly, and the deposited $CO_2$ is distributed over a larger portion of the heat exchange surface. In the same manner, by decreasing the rate of heat transfer in the zone of heat exchange surfaces wherein up to 98% of the $CO_2$ is deposited, the buildup rate of $CO_2$ on said surfaces is likewise decreased. Consequently, the danger of clogging of the heat exchangers is avoided.

There are several basic techniques for decreasing the rate of heat transfer at the desired zone. Theoretically, the decrease can be accomplished by altering one or more of: (1) the over-all heat transfer coefficient of the system, (2) the area of heat transfer, or (3) the temperature difference between coolant and gas. As for the last-mentioned variable, this temperature difference can be decreased by increasing the pressure of the scavenging gas so that the congealed $CO_2$ is sublimed at a higher temperature. In such a system, the cooling comes from the latent heat of vaporization of the $CO_2$ into the scavenging gas which is in indirect heat exchange contact with the raw gas. Thereby, an advantage resides in that latent heats of freezing and sublimation are exchanged concurrently, the temperature of sublimation being chosen approximately 5–10° C. below that of freezing.

Finally, while the rate of heat transfer can be decreased by lowering the over-all heat transfer coefficient, it is to be considered that where the $CO_2$ congeals, the over-all heat transfer coefficient at that location is lowered substantially. Consequently, it appeared that little room for improvement was left in this regard. However, it is this particular variable that has been found to be amenable to large variances. As a consequence, by insulating or otherwise changing the conductivity of the heat exchange surfaces, a lowering of the heat transfer rate is accomplished at the desired location, thus obtaining the benefits of this invention.

So it is possible to reduce the heat transfer by using for the tubes of the heat exchangers a material having a lower heat conductivity than copper or aluminum, for example V2A-steel. A better effect is reached, however, if the heat exchanging surfaces are coated with a plastic, especially if this coating is provided with longitudinal grooves on that surface of it which contacts the metal tube.

When the heat transfer is decreased by reducing the over-all heat transfer coefficient, it is possible to remove the $CO_2$ by either lowering the pressure thereover, or by utilizing a scavenging gas at any pressure.

The preferred technique for lowering the over-all heat transfer coefficient involves the employment of a gas stream that functions as a variable insulator between the raw gas and the subliming $CO_2$. In this connection, the velocity of this gas stream can be used for regulating the heat exchange, i.e., it can be lowered, thereby decreasing the rate of heat transfer in the region of the gases having a high concentration of $CO_2$.

In the range of lower $CO_2$ concentration, i.e., below 1%, the influence of the steep slope of the vapor pressure curve and of the temperature- and pressure-dependent correction factor for the partial pressures is so large that a sufficient sublimation of the congealed $CO_2$ would be possible only with a large quantity of scavenging gas, or with a high vacuum. Therefore, the remaining 1% of $CO_2$ impurities are congealed in at least two periodically reversible heat exchangers.

The construction of cross-countercurrent heat exchangers and reversible heat exchangers is described in "Linde-Berichte aus Technik und Wissenschaft," volume 1, page 5 ff., and volume 3, pages 5 and 6. In particular, the so-called cross-wound, counter-current type of heat-exchanger is often used. This comprises layers of tubing wound spirally on a core, these spirals being alternatively right and left-handed.

For facilitating sublimation of congealed $CO_2$, the respective heat exchanger can, if desired, be warmed up before the impurities are sublimed. A further possibility for facilitating the sublimation comprises passing a warm gas stream countercurrently to the stream containing evaporated impurities in the respective heat exchanger.

This invention is particularly applicable to removal of $CO_2$ from raw gases containing 5 to 40%, preferably 10 to 35% by volume of $CO_2$.

The attached drawing is a schematic illustration of a preferred embodiment of this invention, and shows apparatus for obtaining ammonia-synthesis gas, embodying the principles of this invention for the removal of $CO_2$.

Referring to the drawing, nitrogen is fed to the plant in pure form through conduit 1, for example directly from an air fractionation plant, is then cooled countercurrently to cold raw hydrogen, hydrogen-nitrogen mixture in the heat exchangers 2, 3, and 4, respectively. The cold nitrogen is then liquefied in exchanger 5 by an evaporating mixture of carbon monoxide and nitrogen. The resultant liquid is brought, by means of a liquid pump 6, to the pressure of column 7, and is partly introduced to the top of the column 7 as scrubbing liquid and partly admixed to the hydrogen-nitrogen mixture withdrawn from the head of column 7.

The hydrogen-containing raw gas is fed to the plant through conduit 8. This raw gas contains, by volume, 70% $H_2$, 14% $CO_2$, 16% $CO+N_2$, and 1.4 g./Nm.$^3$ water. 45,000 Nm.$^3$/h. of raw gas at about 20 atmospheres absolute are cooled in the heat exchangers 9 and 10 in countercurrent relation to pure gas and scavenging gas, to the extent that water can be withdrawn in liquid form in separator 11. After pressure reduction, the condensate can be evaporated, the cooling effect of evaporation being transferred to the raw gas.

In the cross-countercurrent heat exchangers 12, 13, 14, and 15 (which can be replaced by plate heat exchangers or the like), the raw gas is cooled down to 150° K. In this process, the residual water is substantially congealed in heat exchanger 12, while the $CO_2$ is frozen out to a content of below 1% in the heat exchangers 13, 14, and 15.

Raw gas is passed through one half of the tubes of the countercurrent heat exchangers, while the other half of the tubes have scavenging gas flowing therethrough in countercurrent relation. The two halves are periodically interchanged, i.e., alternately raw and scavenging gas passes through the pipelines so that in, one half of the pipelines, within a particular period, the $CO_2$ is frozen out of the raw gas, whereas it sublimes in the other half into the scavenging gas.

The raw gas and the scavenging gas are in heat exchange relationship with each other through the pure gas flowing in, the shell of the heat exchangers, around all pipelines, so that the heats of fusion and evaporation are exchanged. Without the insulating effect of the pure gas, a direct heat exchange between the pipelines having scavenging gas and raw gas passing therethrough would, in the range of high $CO_2$ concentration of the raw gas, lead very quickly to a clogging of the heat exchangers, since even with slight decreases in temperature, much $CO_2$ would be frozen out, owing to the steep vapor pressure curve of the solid $CO_2$. Therefore, the heat exchange between the pipelines is conducted not directly but via the pure gas stream, and thus intentionally reduced.

The danger of a "stop-up" in the heat exchangers is most severe in heat exchanger 13, since there the raw gas has the highest concentration of $CO_2$, which would permit a very large quantity of $CO_2$ to freeze out. Consequently, in heat exchanger 13, the velocity of the pure gas is decreased to its lowest level which, in turn, results in the lowest rate of heat transfer in any of the exchangers, thereby avoiding a fast buildup of solid $CO_2$.

The raw gas leaving the heat exchanger 15 is then further cooled to 90° K. in a periodically alternating manner either in the heat exchanger 16 or 17.

In this exemplified process, even the last remainder of $CO_2$ is frozen out. In the range of $CO_2$ concentrations below 1%, the influence of the steep slope of the vapor pressure curve and particularly the correction factor for the partial pressures at low temperatures is noticeable to such an extent that a sufficient sublimation of the frozen-out $CO_2$ would be possible only with a large amount of scavenging gas, or under a high vacuum. Therefore, the last amounts of $CO_2$ are suitably frozen out in the periodically reversible heat exchangers 16 and 17. In this case, the sublimation can be facilitated by warming the respective heat exchanger 16 or 17, before the sublimation, by a few degrees, or by passing, in this heat exchanger, a warm gas stream countercurrently to the sublimation gas.

The residual gas depleted in $CO_2$ and remaining in heat exchangers 16 and 17 just prior to reversal (a heat exchanger must always be made pressureless, i.e., raw gas under pressure must be withdrawn before changing to sublimation gas) is passed via conduit 18 into a compensating vessel 19, wherefrom it can be removed by pumping and further utilized as desired.

The raw hydrogen depleted in $CO_2$ is then introduced into the bottom of column 7 where it is scrubbed countercurrently with liquid nitrogen. In this process, the last impurities are scrubbed out from the nitrogen, so that a pure hydrogen-nitrogen mixture can be withdrawn from the head of column 7. This mixture—after further nitrogen has been added thereto—is passed through the heat exchanger 4 and is then divided into two streams. One stream serves for cooling the nitrogen in heat exchanger 3, and the other stream flows as pure gas through the heat exchangers 16, 17, 15, 14, 13, 12, and 9 and cools the raw gas. Between the heat exchangers 16 and 17 and the cross-countercurrent heat exchanger 15, a portion of the pure gas heated in the heat exchangers 16 and 17 can be forcibly passed, by means of the blower 20, back into the heat exchangers 16 and 17 in order to facilitate the sublimation process conducted therein.

A liquid mixture of nitrogen and carbon monoxide is withdrawn from the bottom of column 7 and is evaporated in heat exchanger 5. Thereafter, this mixture flows alternately as scavenging gas through the heat exchangers 16 and 17, half of the tubes of the heat exchangers 15, 14, 13, and 12, and the heat exchanger 10. Between the heat exchangers 15 and 14, the scavenging gas is passed countercurrently with itself through the heat exchanger 21 and is elevated from 0.5 atmosphere absolute to a higher pressure, to 1.3 atmospheres absolute, by means of a blower 22. This higher pressure permits the $CO_2$ to be sublimed at higher temperatures, thus resulting in a smaller $\Delta T$ between the raw gas and scavenging gas. Consequently, the heat transfer in the subsequent heat exchangers 14, 13, and 12 is further decreased in order to avoid clogging of the heat exchangers.

The utilization of the process of the present invention is not limited to obtaining a hydrogen-nitrogen mixture, or to the purification of synthesis gases, as described in the preferred embodiment. The process of this invention can be employed advantageously for the removal of any congealable impurity from any gas stream, for example, for the elimination of $CO_2$ and $H_2S$ from natural gas, for the removal of acetylene from raw ethylene-fractions, and for drying any desired gases. In the latter case, in accordance with the inventive idea, the drying process is performed under such conditions of temperature and pressure that the moisture is frozen out and not liquefied.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the low temperature removal of a congealable $CO_2$ impurity from a row gas having relatively high concentrations of this impurity, which process comprises passing the raw gas over alternating heat exchange surfaces operated during a cycle at sufficiently low temperatures to congeal said impurity on said heat exchange surfaces, said heat exchange surface being in simultaneous heat exchange relationship with vaporizing congealed impurity, the improvement comprising significantly and positively providing means to decrease the rate of heat transfer in the zone of heat exchange surface where the concentration of the congealable impurity remaining in the raw gas is greater than at least about 1% by volume so that the buildup rate of congealed impurity on said heat exchange surfaces within said zone is decreased.

2. A process as defined by claim 1, further comprising passing scavenging gas over said congealed impurity deposited on said heat exchange surfaces to evaporate said impurity, said scavenging gas having been previously compressed to a sufficient pressure to permit a temperature difference of 5 to 10° C. between the raw gas and the compressed scavenging gas.

3. A process as defined by claim 1 wherein said decreasing the rate of heat transfer is conducted by insulating said heat exchange surface in said zone from cooling surface.

4. A process as defined by claim 3 wherein said cooling surface is cooled by evaporating congealed impurity.

5. A process as defined by claim 4 wherein said evaporating congealed impurity is conducted in first tubes, and congealable impurities are deposited in second tubes, said first and second tubes being in indirect heat transfer relationship through an intermediate fluid enveloping both said first and second tubes.

6. A process as defined by claim 1 wherein residual $CO_2$ in said raw gas of about 1% is removed by passing such gas through at least two periodically reversible heat exchangers.

7. A process as defined by claim 2 wherein said $CO_2$ is congealed in at least three separate heat exchangers in series.

8. A process as defined by claim 1 comprising the further step of evaporating congealed impurity in first tubes; and wherein said congealable impurities are deposited in second tubes, said first and second tubes being in indirect heat transfer relationship through an intermediate fluid enveloping both said first and second tubes.

9. A process as defined by claim 1 wherein the concentration of the congealable impurity in said raw gas is at least about 5% by volume.

10. A process as defined by claim 1 wherein the concentration of the congealable impurity in said raw gas is at least about 10% by volume.

11. A process as defined by claim 1 wherein the zone of decreased heat exchange is defined by the area wherein at most about 98% of the congealable impurity is deposited.

12. A process as defined by claim 9 wherein the zone of decreased heat exchange is defined by the area wherein at most about 98% of the congealable impurity is deposited.

13. A process as defined by claim 10 wherein the zone of decreased heat exchange is defined by the area wherein at most about 98% of the congealable impurity is deposited.

14. In a process for the low temperature removal of congealable impurity from gas over alternating heat exchange surfaces operated during a cycle at sufficiently low temperatures to congeal said impurity on said heat exchange surfaces, said heat exchange surfaces being in simultaneous heat exchange relationship with vaporizing congealed impurity, the improvement comprising decreasing the rate of heat transfer in a zone of heat exchange surface where the concentration of the congealable impurity is greater than at least about 1% by volume by insulating said heat exchange surface in said zone from cooling surface so that the buildup rate of the congealed impurity on said heat exchange surface within said zone is decreased, said cooling surface being cooled by evaporated congealed impurity, said evaporated congealable impurities being conducted in first tubes and congealable impurities being deposited in second tubes, said first and second tubes being in indirect heat transfer relationship through an intermediate fluid enveloping both said first and second tubes, said intermediate fluid being maintained at decreased velocity adjacent said zone as compared to other parts of said heat exchange surfaces.

15. In a process for the low temperature removal of a congealable impurity from a gas, which process comprises passing raw gas over alternating heat exchange surfaces operated during a cycle at sufficiently low temperatures to congeal said impurity on said heat exchange surfaces, said heat exchange surface being in simultaneous heat exchange relationship with vaporizing congealed impurity, the improvement comprising decreasing the rate of heat transfer in a zone of heat exchange surface where the concentration of the congealable impurity is still very high so that the buildup rate of the congealed impurity on said heat exchange surfaces within said zone is decreased; and evaporating congealed impurity in first tubes; and wherein said congealable impurities are deposited in second tubes, said first and second tubes being in indirect heat transfer relationship through an intermediate fluid enveloping both said first and second tubes, said intermediate fluid being maintained at a decrease velocity adjacent said zone as compared to other parts of said heat exchanger surfaces.

References Cited
UNITED STATES PATENTS

| | | | |
|---|---|---|---|
| 2,460,859 | 2/1949 | Trumpler | 62—15 XR |
| 2,653,455 | 9/1953 | Etienne | 62—13 |
| 3,064,441 | 11/1962 | Kasbohm | 62—12 |
| 3,258,930 | 7/1966 | Jakob | 62—13 XR |
| 2,589,262 | 3/1952 | Keith. | |
| 2,763,137 | 9/1956 | Collins | 62—13 |
| 2,863,295 | 12/1958 | Newton | 62—13 |

NORMAN YUDKOFF, Primary Examiner

U.S. Cl. X.R.

62—28, 30; 252—377